United States Patent [19]

Moore et al.

[11] 4,263,992
[45] Apr. 28, 1981

[54] FABRICATED DISC BRAKE ROTOR ASSEMBLY

[75] Inventors: Thomas S. Moore, Northville; Terrence Smith, Dearborn; Earl L. Helmers, Westland, all of Mich.

[73] Assignee: Ford Motor Company, Dearborn, Mich.

[21] Appl. No.: 947,277

[22] Filed: Sep. 29, 1978

[51] Int. Cl.³ .............................................. F16D 65/12
[52] U.S. Cl. ...................... 188/218 XL; 188/264 AA; 192/107 R; 192/113 A
[58] Field of Search .... 188/218 XL, 264 A, 264 AA, 188/71.6; 192/70.12, 107 R, 113 A

[56] References Cited

U.S. PATENT DOCUMENTS

| | | |
|---|---|---|
| 1,453,599 | 5/1923 | Parker .............................. 192/113 A |
| 2,215,420 | 9/1940 | Eksergian . |
| 2,410,195 | 10/1946 | Baselt et al. .................. 188/218 XL |
| 2,627,325 | 2/1953 | Helsten . |
| 2,745,518 | 5/1956 | Bachman . |
| 3,403,760 | 10/1968 | Caskey . |
| 3,623,579 | 11/1971 | Hendrickson . |
| 3,661,235 | 5/1972 | Harrison ....................... 188/218 XL |
| 3,730,304 | 5/1973 | Buyze . |
| 3,899,054 | 8/1975 | Huntress et al. . |
| 4,132,294 | 1/1979 | Poli ............................... 188/218 XL |

FOREIGN PATENT DOCUMENTS

| | | |
|---|---|---|
| 1103375 | 3/1961 | Fed. Rep. of Germany .... 188/218 XL |
| 2235627 | 1/1974 | Fed. Rep. of Germany . |
| 1725008 | 8/1976 | Fed. Rep. of Germany . |
| 2545544 | 6/1978 | Fed. Rep. of Germany . |

*Primary Examiner*—George E. A. Halvosa
*Attorney, Agent, or Firm*—Steven L. Permut; Clifford L. Sadler

[57] ABSTRACT

A brake disc rotor is formed from two disc shaped members with each disc having a flat surface and integrally formed fins extending from an opposing surface thereof. The ends of the fins are welded together to form the rotor. The fins of one member are welded to a convoluted outer rim section of a hat which is secured to a wheel bearing assembly.

2 Claims, 5 Drawing Figures

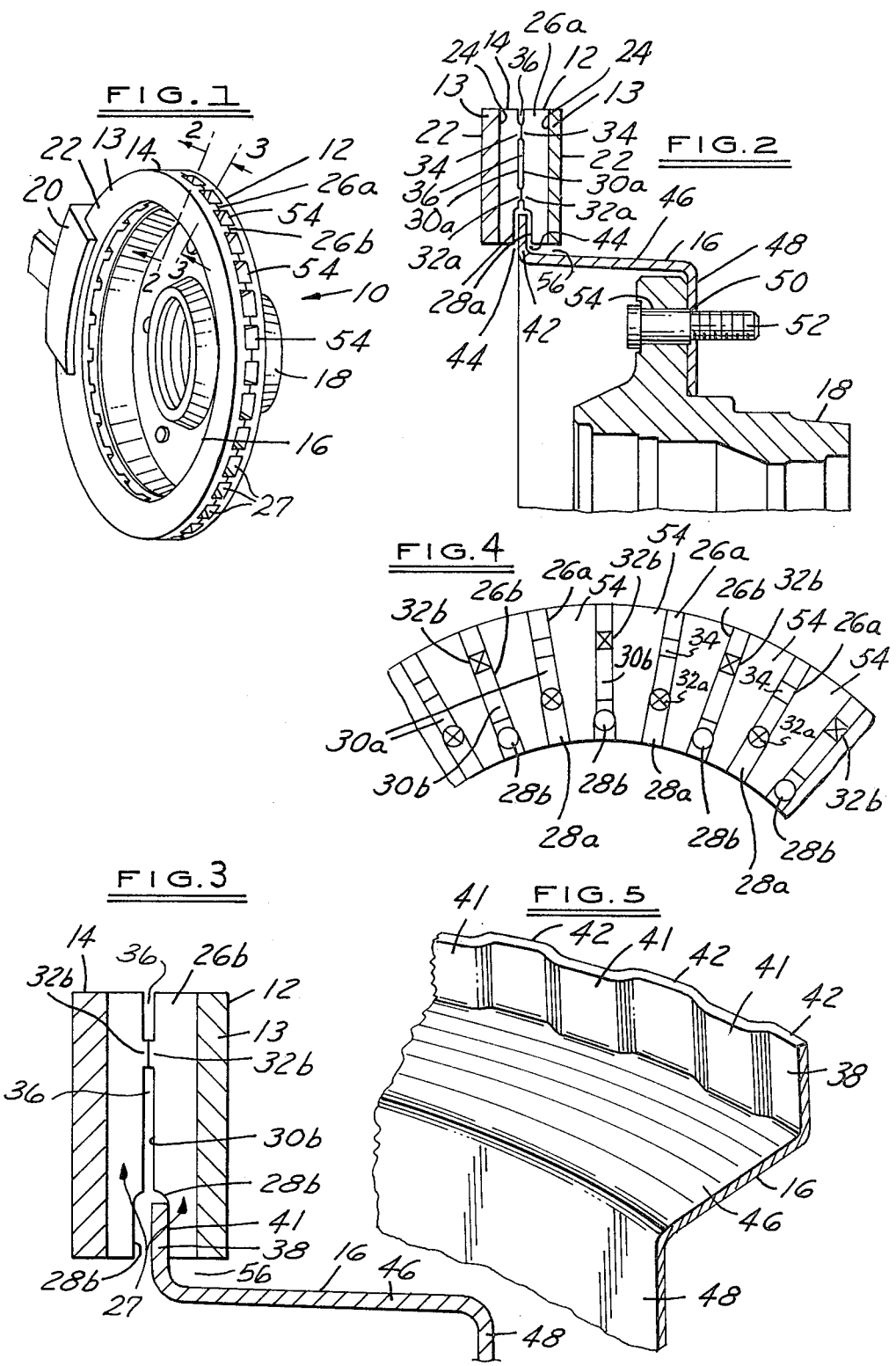

FABRICATED DISC BRAKE ROTOR ASSEMBLY

BACKGROUND OF THE INVENTION

1. Field of the Invention

This invention relates to disc brake rotors and more particularly to ventilated disc brake rotors.

2. Description of the Prior Art

Disc brake rotors produce large amounts of heat when the disc is being frictionally engaged with braking pads. The excess heat must be dissipated in order to prevent warpage or even melting of the rotor.

One way to dissipate heat is to increase the exposed surface area of the rotor. One way to increase the surface area is to make the disc larger. A second way is to ventilate the disc. Ventilation of the disc must be accomplished while maintaining smooth braking surfaces. Proper ventilation is most commonly done by introducing a hollow center between the braking surfaces with vanes extending across the hollow center between the two braking surfaces. The vanes have large surface areas surrounded by air which turbulantly passes through the center as the rotor is spinning about its axial center. Ventilated disc brake rotors must still be strong enough to resist the compressive forces exertion thereon by the brake pads. Most commonly the rotor is cast as a uniform piece. Fabricated rotors also are known in the art where two discs and a separate fin section are welded together.

Ventilated disc rotors have been disclosed in U.S. Pat. No. 2,627,325 issued to Helsten on Feb. 3, 1953; U.S. Pat. No. 3,661,235 issued to Harrison on May 9, 1972; U.S. Pat. No. 3,899,054 issued to Huntress et al on Aug. 12, 1975; U.S. Pat. No. 3,730,304 issued to Buyze on May 1, 1973; U.S. Pat. No. 3,623,579 issued to Hendrickson et al on Nov. 30, 1971; U.S. Pat. No. 2,215,420 issued to Eksergian on Sept. 14, 1940; U.S. Pat. No. 2,745,518 issued to Bachman on May 15, 1956 and U.S. Pat. No. 3,403,760 issued to Caskey on Oct. 1, 1968.

The Helsten patent discloses a ventilated brake rotor with a first set of vanes attached to and supporting both brake surfaces and a second set of fins attached to only one of the first or second brake discs.

The Harrison and Huntress et al references disclose a ventilated rotor which is integrally cast as one piece.

The Eksergian, Bachman and Caskey references disclose a fabricated brake rotor comprising of two discs and a fin section attached between the discs.

SUMMARY OF THE INVENTION

According to the invention a rotor for a disc brake assembly is fabricated from a first and second annular shaped member mounted to each other. Each annular member has an annular disc portion and integrally formed fins extending from one side of the disc portion. The opposing side of the disc portion is flat for application of a brake pad thereto. The first annular member is rigidly secured to the second annular member such that the disc portions are substantially parallel with the integral fins extending between the two disc portions.

The second member is mounted to the first member by the integral formed fins of the second member mounted edgewise onto a corresponding edge of the integrally formed fins of the first annular member.

In one embodiment, the fins are circumferentially spaced and radially aligned about the center of the annular member—with their welded edges radially aligned about the center of the annular member and spaced from the respective plate. In one embodiment the radially aligned edges have a radial inner recessed shoulder such that a gap exists between two aligned fins.

In one embodiment, the rotor is mounted to a hub. The rim of the hub of the brake assembly extends through the gap and abuts a plurality of the fins. Preferably the rim is welded onto the recessed shoulder of the fins of the first plate. In addition, the hat section of the hub has an outer diameter less than the inner diameter of the annular members to form a gap between one annular member and the exterior surface of the hat section to provide air flow from the exterior side of the hat through the gap and through the aforementioned gap in the fin section.

In this embodiment the aligned edge also has projections extending therefrom which make contact with projections extending from corresponding aligned edges of fins of the second annular member. The projections are welded together to mount the second annular member to the first annular member. In one embodiment, the projections are alternately positioned at a radially inner portion of the aligned edge of a fin and the radially outer portion of the aligned edge of an adjacent fin.

Preferably a substantial portion of the radially aligned edge of each fin is recessed with respect to the projection such that when the projections are welded together, a clearance exists between the two aligned fins of the respective annular members.

In addition, the fins that have projections at a radially inner position also have an extension at an outer portion thereof which contact a similar extension of an aligned fin.

These extensions abut each other but are not welded together. The extensions retain the clearance between aligned fins against the compressive forces of brake pads being applied to the flat sides of both disc portion.

Preferably the rim is convoluted such that it makes contact only with intervally spaced fins of one annular member.

Further, according to the invention the disc brake rotor is manufactured from a forging of metal forming one annular member and a second forging forming the second annular member with the integral fins of each annular member then being welded together to form the rotor.

BRIEF DESCRIPTION OF THE DRAWINGS

Reference now will be made to the following drawings, wherein the presently preferred form of this invention is shown in which:

FIG. 1 is a perspective view of an embodiment of the invention.

FIG. 2 is a fragmentary cross sectional view taken along the section lines II—II in FIG. 1.

FIG. 3 is a fragmentary cross sectional view taken along the lines III—III shown in FIG. 1.

FIG. 4 is a fragmentary side elevational view of one of the annular plates with fins.

FIG. 5 is a perspective fragmentary view of the hat section shown in FIG. 1.

DETAILED DESCRIPTION OF THE PRESENTLY PREFERRED EMBODIMENT

The brake assembly 10 as shown in FIG. 1 has two steel annular plates 12 and 14 mounted to a hat shaped support member 16 which in turn is mounted to a wheel bearing housing 18. The assembly 10 has a plurality of vents 27 between a plurality of fins 26(a) and 26(b). Brake calipers 20 are mounted about the annular plates 12 and 14 and to a vehicle (not shown) in a conventional fashion.

Plate 12 is forged from steel bar stock. Plate 12 has a disc portion 13 and a plurality of integrally formed, radially extending fins 26(a) and 26(b) that project perpendicular from side 24 of disc portion 13. Disc portion 13 has an opposing or outer flat side 22 for contact with a brake shoe carried by a brake caliper 20. As clearly shown in FIGS. 2 and 3 fins 26(a) and 26(b) each have a recessed shoulder 28(a) and 28(b) respectively.

As more clearly shown in FIGS. 2, 3 and 4, fins 26(a) have in addition an inner edge 30(a) with a projection 32(a) extending from the inner edge 30(a). Projection 32(a) is located at a radially inner and widened portion of inner edge 30(a). At a radially outer portion of fin 26(a) is an extension 34 which extends the same distance from the inner edge as projection 32(a).

Fins 26(b) have shoulders 28(b) located at a radially inner and widened section thereof. At a radially outer portion of fins 26(b) are projections 32(b) which extend from the inner edge 30(b).

Plate 14 is forged by the die from the same mold as plate 12 and is identical in structure as plate 12 with the corresponding parts of plate 14 numbered identically with the corresponding parts of plate 12. Projections 32(a) and 32(b) of plate 12 as shown in FIGS. 2 and 3 abut an aligned projection 32(a) and 32(b) respectively of plate 14 and are spot welded together to rigidly mount plate 14 to plate 12. As shown in FIG. 4, the welds alternate between a radially inner and radially outer position of the annular plates. In addition, extensions 34 of plate 12 abut extensions 34 of plate 14 but are not welded together. The extensions 34 and projections 32(a) and 32(b) retain a clearance 36 formed between the fins of plate 12 and fins of plate 14 against compressive forces exerted on the flat surfaces 22 of plates 12 and 14 by the brake calipers 20.

In addition every other fin 26(b) of plate 12 is welded to a convoluted rim 38 of the hat section 16 at portions 41. The axially outer portion 41 of the convoluted rim 38 abut and are welded to the recessed shoulders 28(b). Convoluted portions 42 of rim 38 fit between the shoulders 28(a) of plates 14 and plates 12 with a space 44 therebetween.

The hat section 16 has a cylindrical surface 46 and an annular planar surface 48. Surface 46 can also be frustoconical in shape. Surface 46 defines a diameter in the plane including the annular disc portion 13 of plate 12 that is smaller than the inner diameter of the annular disc portion 13 to form an annular gap 56 therebetween. Apertures 50 extend through surface 48 to receive studs 52. Studs 52 also extend through aligned apertures 54 in wheelbearing housing 18 such that the hat section 16 is securely mounted to the bearing housing 18. The studs 52 provide a means for connecting the vehicle wheel (not shown) to the wheel bearing housing 18.

In operation, the rotor rotates with the bearing housing 18 and the vehicle wheel which is to be supported on the housing 18. When it is desired to brake the wheel, the brake caliper 20 is actuated to cause the brake linings to engage the flat sides 22 of disc portion 13 of plates 12 and 14. The braking action creates heat which is transferred to the fins 26(a) and 26(b) and is dissipated through the vents 27, clearances 36 positioned between the fins 26(a) and (b), and annular gap 56. Also some heat is transferred to the wheel hat section 16 and bearing housing 18.

The brake rotor is manufactured by forging two identical rotor plates with integral fins welding plates together at their aligned fins and welding one plate to a hat section mounted to a wheel bearing.

The fins being an integral part of the annular plate more easily transfer heat from the annular plate flat surface to dissipate the heat to the vents and clearances surrounding the fins.

Variations and modifications are possible within the scope of the foregoing disclosure and drawings without departing from the spirit of the invention which is defined by the appended claims.

We claim:

1. A rotor for a disc brake assembly comprising
first and second annular members;
said first annular member having an annular disc portion and integrally formed fins extending from one side of said disc portion;
the fins being spaced circumferentially about a central axis of the annular member;
the opposing side of said annular disc portion being flat;
said second annular member having an annular disc portion positioned substantially parallel to said disc portion of said first annular member;
a plurality of fins integrally formed with said second member extending from one side of said annular disc portion of said second member;
the opposing side of said disc portion of said second member being flat;
said fins of said second member being spaced circumferentially about a central axis of the annular member;
said fins of the first and second members extending toward each other with a plurality of said fins of said first member being aligned with a plurality of said fins of said second member whereby a plurality of pairs of aligned fins are formed;
within each pair of aligned fins said fins of the first annular member extend toward and abut projections extending from said fins of said second annular member;
said abutting projections of said first annular member being welded to said fins of said second annular member;
each of said fins of said pairs of fins having an edge extending toward a corresponding edge of an aligned fin;
a substantial portion of the extending edges of said fins of said pairs of fins being recessed with respect to the projections such that only the projections of one fin contacts the other of said aligned fins and a clearance exists between said edges;
the radially inner portion of at least one of the fins of each pair of aligned fins having a recessed shoulder;
a central hub having a hat shaped section with the axial end of the hat shaped section integrally formed with a radially extending rim extending through the gap formed between the recessed shoulder and corresponding edge of said aligned fin;
the rim abutting and secured to a plurality of intervally spaced fins at the recessed shoulder portion and having a radially outer periphery not exceeding the outer radial extent of the shoulder portion;

the diameter of said hat shaped section being smaller than the inner diameter of said annular member in the plane containing said annular member to form an annular gap therebetween to facilitate air flow from the exterior side of said hat shaped section, through the gap and about the fins.

2. A rotor for a disc brake assembly comprising first and second annular members;

said first annular member having an annular disc portion and integrally formed fins extending from one side of said disc portion;

the fins being spaced circumferentially about a central axis of the annular member;

the opposing side of said annular disc portion being flat;

said second annular member having an annular disc portion positioned substantially parallel to said disc portion of said first annular member;

a plurality of fins integrally formed with said second member extending from one side of said annular disc portion of said second member;

the opposing side of said disc portion of said second member being flat;

said fins of said second member being spaced circumferentially about a central axis of the annular member;

said fins of the first and second members extending toward each other with a plurality of said fins of said first member being aligned with a plurality of said fins of said second member whereby a plurality of pairs of aligned fins are formed;

within each said pair of aligned fins said fins of the first annular member extend toward and abut projections extending from said fins of said second annular member;

projections of one fin on one annular member abut and are welded to corresponding projections on said aligned fins on the other annular member;

each of said fins of said pairs of fins having an edge extending toward a corresponding edge of an aligned fin;

a substantial portion of the extending edges of said fins of said pairs of fins being recessed with respect to the projections such that only the projections of one fin contacts the projections of said aligned fin and a clearance exists between said edges;

the radially inner portion of at least one of the fins of each pair of aligned fins having a recessed shoulder;

a central hub having a hat shaped section with the axial end of the hat shape section integrally formed with a radially extending rim extending through the gap formed between the recessed shoulder and corresponding edge of said aligned fin;

the rim abutting and secured to a plurality of intervally spaced fins at the recessed shoulder portion and having a radially outer periphery not exceeding the outer radial extent of the shoulder portion;

the diameter of said hat shaped section being smaller than the inner diameter of said annular member in the plane containing said annular member to form a gap therebetween to facilitate air flow from the exterior side of said hat shaped section, through the gap and about the fins; and the outwardly extending rim being convoluted such that the rim abuts intervally spaced fins of one annular member and extends through the space between the other fins with a gap between the rim and fins.

* * * * *